Patented July 13, 1954

2,683,752

UNITED STATES PATENT OFFICE 2,683,752

DEPHENOLIZATION

William E. Stanley, Jr., and Robert A. Dinerstein, Park Forest, Ill., assignors to Standard Oil Company, Chicago, Ill., a corporation of Indiana No Drawing. Application November 21, 1952, Serial No. 321,956

6 Claims. (Cl. 260—627)

This invention relates to a method of extracting phenols from aqueous solutions thereof and pertains more particularly to a method for purifying waste waters by removing phenols therefrom. The presence of phenol in waste waters presents a serious problem in the disposal of such waters since phenol, even though considerably diluted, is not only toxic to marine animal life but also contributes an unpleasant odor and taste to drinking water even when present in only a few parts per million and especially when combined with chlorine. This application is a continuation-in-part of our copending application Serial No. 149,205, filed March 11, 1950, now abandoned.

Several methods and means have been employed for the removal of phenols from waste waters. One of these is the dephenolization of such solutions by extracting the phenol in a relatively water insoluble organic medium, usually an aromatic compound such as benzene, and thereafter liberating the phenol from the extraction medium which is then reemployed. However, none of these extractants has proved wholly satisfactory, because those having a high enough distribution coefficient with respect to phenol in water to be economically favorable display other deficiencies, for example, an excessive solubility in water, an excessive sensitivity to the pH of the solute, or a tendency to form strong, difficultly separable emulsions.

The enormous volume of waste waters produced by modern industry, the frequent occurrence of phenols in such waters, and the desire to avoid contamination of surface waters even by waste waters of extremely low phenol concentration greatly enhance the need for improved dephenolization methods.

The primary object of this invention is the provision of an efficient and improved method of removing phenol from aqueous solutions. Another object of the invention is the provision of an improved method of purifying waste waters. A further object of the invention is the provision of an extractant substance having a sufficiently high distribution coefficient, calculated with respect to the concentration of phenol in the extractant compared to the concentration in water at equilibrium, to provide an economically favorable phenol extraction process. The invention has for further objects such other improvements, advantages and results as may appear in the specification or in the claims hereinafter made.

Briefly stated, this invention comprises the extraction of phenol and its homologs from waste aqueous solutions by treatment thereof with at least a fraction of the formylation bottoms product of an Oxo process in which the feed is an olefinic hydrocarbon having between three and sixteen carbon atoms per molecule. The well-known Oxo process includes a formylation step in which olefinic hydrocarbons are reacted with hydrogen and carbon monoxide in a mol ratio between about 4:1 and 1:4 in the presence of a cobalt catalyst that can be supplied by adding to the reaction zone a potential cobalt catalyst, for example, cobalt naphthenate or cobalt acetate, at a temperature between about 100° and 250° C. and a pressure from about 100 to 300 atmospheres. The formylation product, which consists of unreacted olefins, aldehydes and some heavier compounds, is then fractionated, usually by a steam distillation, and an intermediate cut is then hydrogenated to produce Oxo alcohols. The residue of the fractional distillation constitutes the said formylation bottoms product. Such formylation bottoms may be obtained, for example, from line 108 in the process shown in Fig. 2 of U. S. Patents 2,638,487 and 2,638,488. The extraction is usually performed at atmospheric temperature although it is often preferable, as, for example, when a waste water has an elevated temperature, to use temperatures of about 40° to 80° C. Contact times of sufficient duration to provide efficient extraction of the phenol from aqueous solution will vary, depending upon such factors as degree of intermixing, phenol concentration in the aqueous solution, and temperature of extraction, and can be readily determined for each application.

The formylation bottoms product will consist primarily of heavier aldehydes, esters, some acid, aldol condensation product and a small amount of alcohols. The bottoms product contains a mixture of compounds of higher molecular weight, including esters and aldol condensation products. This mixture of the larger molecules is termed Oxo bottoms and is separated from the remainder of the Oxo product by distillation, in which the Oxo bottoms remain as a residue in the still. The Oxo formylation bottoms comprise from about 10 to 50% aldehydes, from about 1 to 15% organic acids, about 5 to 40% esters, about 0 to 10% and usually 0 to 3% of alcohols and the remainder acetals and condensation products. When, for example, the reactant olefin is a mixture of octenes, the Oxo formylation bottoms consist of material boiling within the range of about 100° C. at 5 mm. (about 275° C. at 760 mm. Hg) to 280° C. at 1.0 mm. Hg absolute pressure (est. 550° C. at 760 mm. Hg).

The formylation bottoms product will vary in average molecular weight and boiling point range depending on what olefin is used in the Oxo process by which the product is produced; but because of the tendency of the lighter products to polymerize, of the fact that light products can be fractionated from the bottoms to a greater or lesser extent, and of the fact that only a fraction of the bottoms may be used as the extractant, the bottoms-product extractants exhibit a reasonable molecular-weight and boiling-point range and display relatively uniform extraction characteristics. The extractant will boil at a temperature sufficiently higher than that of phenol to ensure easy separation of absorbed phenol.

Outstanding beneficial characteristics of the Oxo formylation bottoms as a phenol extractant are the insolubility of the Oxo bottoms in water, the fact that Oxo bottoms can be used without further refinement, and the excellent and unexpected distribution coefficient displayed by these bottoms. The distribution coefficient is defined as a ratio of equilibrium concentrations of phenol in water and in the formylation bottoms when equal volumes of the water and the bottoms are used and may be expressed by the equation:

$$K\left(\frac{V_2}{V_1}\right) \times \left(\frac{s-b}{b}\right)$$

in which K is the distribution coefficient, $V_2$ is the employed volume of phenol-bearing water, $V_1$ is the employed volume of Oxo bottoms, $s$ is the initial phenol concentration in waste water, and $b$ is the final phenol concentration in the waste water.

Aqueous solutions containing phenols may be extracted with the described Oxo bottoms over a wide range of ratios of phenolic solution to Oxo bottoms. Volume ratios of aqueous phenol solution of Oxo bottoms from 20:1 to 0.5:1 are suitable. The process is effectively operable when extracting phenol from solutions having a pH of less than about 9.0. The Oxo bottoms extractant is most efficiently utilized when it is brought continuously into countercurrent contact with aqueous phenolic solutions. As is conventional in such extraction operations, fresh or dephenolized formylation bottoms are brought into contact with almost completely dephenolized aqueous phenolic solutions, and phenol-enriched extractant is bought into contact with untreated phenolic solutions. Various methods and means can be employed to provide such countercurrent contact. For example, the solvent and solute can be mixed in a series of centrifugal pumps and be directed after each mixing to a separation stage from which the separated solvent and solute are sent respectively to further quantities of solute having a high phenol content and to solvent having a lower phenol content. The phenolic solution and extractant can also be continuously and countercurrently contacted in a packed scrubber column, in which case the aqueous phenolic solution will constitute a continuous phase passing down through a packed column countercurrently to rising globules of Oxo bottoms extractant. Extractant and solute separate in zones disposed, respectively, at the top and bottom of the column and the solute is preferably passed to a coalescer to remove further quantities of extractant. The unusually high efficiency of Oxo formylation bottoms in dephenolization of aqueous solutions will provide higher than 95% removal of phenols by such concurrent and preferably continuous extraction.

The efficiency of the extractant is more than double that of benzene as measured by the methods and under the test conditions employed by the inventors, and it usually displays a distribution coefficient of about 11.0. This will vary depending upon the concentrations encountered in the waste solutions, the pH of the solution and the temperature of extraction, but, as an inherent characteristic of the Oxo bottoms, does not vary widely. A contact time of phenol solution with bottoms product extractant between about 10 and 180 seconds will substantially uniformly provide an efficient extraction although more protracted periods, e. g., about 15 minutes, may be used. The extraction process can be performed at any suitable temperature higher than the freezing point of the solvent or solute and below the boiling point of any major component of the solutions. A preferred temperature range is 10° to 80° C. within which range no significant variation in extraction efficiency has been observed.

Phenol-enriched Oxo-bottoms product is prepared for treatment of further quantities of phenolic liquors in a regeneration step in which absorbed phenol is liberated from the said bottoms product. Regeneration is preferably accomplished by steam-distilling the phenol-enriched bottoms-product extractant. Steam distillation is preferably performed at atmospheric pressure but can be performed under a vacuum. Phenol-enriched or spent extractant can be effectively regenerated by steam distillation without incurring, in most instances, more than about a 1 to 2% loss of the extractant oil. The liberated phenol can be purified by distillation or clarification steps.

Regeneration can also be accomplished by treating the enriched bottoms-product with a dilute aqueous solution of an alkali metal hydroxide after which phenol can be recovered from the so-formed alkali metal phenolate by adding a stronger acid or by treating with, for example, flue gas to liberate the phenol. Another method of regenerating Oxo-bottoms consists of a simple vacuum or flash distillation and when this means is employed in adequate apparatus providing efficient distillation, the regenerated extractant will display a useful distribution coefficient. However, it is especially important that the phenol be quite thoroughly removed from the enriched extractant in order to provide a regenerated extractant having a good distribution coefficient and to remove this phenol without substantial decomposition of the extractant constituents. We have found that, in the equipment at our disposal, steam distillation of the enriched Oxo-bottoms extractant most effectively accomplishes this purpose. If care is not taken to remove a substantial portion of the adsorbed phenol especially when employing caustic washing or vacuum distillation for regeneration, the extractant, after a few successive regenerations will begin to show distribution coefficients as low as 2 or 3. Regeneration by caustic washing may also introduce emulsion problems which have, however, been corrected by use of an emulsion breaker.

The residue of the fractional distillation of the product in the first stage of an Oxo synthesis can also be pretreated prior to its use as an extractant by any one of the several methods that can be employed in regenerating extractant. It is, therefore, within the scope of our invention to pretreat the said residue or a fraction of the said residue with an aqueous solution of alkali metal hydroxide, or to steam-distill the residue and separate out, for example, a very high or very low volatile portion of the residue prior to use as an extractant, or to flash-distill, in vacuo, the residue and thereby remove a small portion of the residue, for example, some high-volatile constituents, prior to its use as an extractant. Thus fresh, pretreated or regenerated formylation product or a fraction thereof can be used alone or in admixture in any proportion as the phenol extractant.

The bottoms product of the first stage of an Oxo process employing a mixture of octenes as the feed showed the following analysis:

Percent hydroxyl_____ 0.33
Neutralization number_____ 9.05
Esterification number_____ 32.15
Carbonyl number_____ 23.10

The foregoing formylation bottoms product, either before or after pretreatment such, for example, as caustic washing, steam distillation, or vacuum stripping, is an excellent example of an improved extractant for the recovery of phenol from aqueous solution.

Another example of the improved extractant is a residue of the distillation of the product of the first stage of the Oxo synthesis employing a mixture of heptenes as the feed. This extractant, which was employed in the following specific examples, is a composite of the residues from the Oxo process operated at a varying temperature from 130° to 200° C., at a pressure of 3,000 to 3,800 p. s. i. g., and at an hourly specific velocity varying between 0.35 and 1.5. The concentration of cobalt catalyst compound varied between 0.025 and 0.10 weight percent and a recycle ratio varying between 0 and 4 volumes of liquid product per volume of fresh feed. The mol ratio of carbon monoxide to hydrogen was 1:1 and these gases were introduced at a rate varying between 1.05 and 6.5 mols per mol of olefin. The olefin charge contained approximately 83 percent by weight of heptenes, 11 percent by weight of octenes, and 6 percent by weight of hexenes. The distillation residue constituted about 15% by volume of the total liquid formylation product. A second distillation of the residue at a temperature of about 135° C. and a pressure of 10 mm. Hg removed about 50% of the residue as volatile distillate. The Oxo-bottoms prior to distillation or other pretreatment had a neutralization number of 39.5, an esterification number of 10.2 and a carbonyl number of 87.2. No reliable hydroxyl numbers could be obtained because of masking by the high carbonyl content of the extractant. However, this distillation residue, after caustic pretreatment, displayed a percent of hydroxyl of 7.4, a number that may still be high because of carbonyl content. Steam distillation of the residue prior to its employment as an extractant can be used to further improve the extractant since such distillation by removing more volatile components, e. g., the remaining hydroxyl compounds, ensures substantially complete insolubility in water.

*Example I*

An aqueous solution containing 1983 parts per million of phenol was extracted with the above-described formylation bottoms product from which had been distilled a low boiling fraction. The fractionation was performed at an absolute pressure of 90 mm. Hg over a distillation temperature range of 40° to 71° C. This distillation removed 2.7% by volume of the formylation bottoms product. Five parts of the aqueous phenol solution were shaken with one part of the extractant for about 2 minutes at room temperature. The extractant and solution were allowed to separate by settling. An analysis of the treated aqueous phenol solution showed that a reduction of 70.2% of the concentration of the phenol was obtained. This corresponds to a distribution coefficient of 11.7.

One-half of the phenol-enriched extractant was heated to a temperature of 84° C. at an absolute pressure of 148 mm. Hg. This was employed to remove phenol from an aqueous solution containing approximately 2,000 parts per million of phenol. One volume of extractant was employed to treat five volumes of an aqueous phenol solution. A reduction in the phenol concentration of 52% was obtained. This corresponds to a distribution coefficient of 5.5. This reduction in distribution coefficient indicates a failure to remove part of the phenol from the extractant.

The other half of the phenol-enriched extractant from the first above extraction step was dephenolized by washing it with an equal volume of a 20% aqueous solution of sodium hydroxide and by twice washing the extractant with water to remove sodium phenolate. This regenerated extractant was employed to dephenolize an aqueous solution of phenol in a concentration of about 630 parts per million of phenol. This dilute concentration approximates the phenol concentration that might be encountered in a second extraction step or to the average concentration which might exist in the lower half of an extraction tower. A reduction of almost 70% of the phenol concentration was obtained. This corresponds to a distribution coefficient of over 11, or substantially that of fresh extractant.

*Example II*

Another portion of the extractant employed in Example 1 was mixed with an aqueous solution of phenol in a concentration of 1970 parts per million of phenol in a volume ratio, respectively, of 1:5. Reduction in the phenol concentration of the solution of over 72% was obtained. This corresponds to a distribution coefficient of 12.9. The run was repeated under substantially identical conditions with a fresh sample of the formylation residue and a distribution coefficient of 12.5 was obtained.

The phenol-enriched extractant from the repeated run was washed with a 20% aqueous solution of sodium hydroxide to remove the phenol. When a portion of the caustic-washed extractant was washed with an equal volume of water, residual caustic solution was incompletely removed and emulsion difficulties were encountered during a subsequent extraction step. Another portion of the caustic-washed extractant was washed twice, each time with an equal volume of water. One volume of the so-regenerated extractant was mixed with five volumes of an aqueous solution of phenol containing 1970 parts per million of phenol. The extractant removed 70% of the phenol, thus displaying a distribution coefficient of 12.2.

*Example III*

An extractant consisting of another portion of Oxo-bottoms employed in Example I was pretreated with a 20% aqueous solution of sodium hydroxide and subsequently water-washed. One volume of the caustic-washed extractant was employed to extract phenol from 5 volumes of an aqueous solution of phenol in a concentration of 1956 parts per million. The extraction was performed at room temperature, and the extractant and aqueous solution were agitated in contact with each other for a period of about 2 minutes, after which the mixture was separated by settling and the extractant was decanted. A reduction of 70.4% of the phenol content, corresponding to a distribution coefficient of 11.9, was obtained. When this extractant was regenerated by caustic washing followed by one washing with an equal volume of water, the so-regenerated extractant exhibited a distribution coefficient in a subsequent phenol extraction step of 8.1.

*Example IV*

An Oxo-bottoms product substantially the same as that employed in Example I was steam-distilled to remove 24.3% by volume of the lower boiling constituents therefrom. One volume of the residue of this second distillation of the Oxo product was employed to extract phenol from 5 volumes of an aqueous solution thereof in a concentration of 1943 parts per million. Analysis of the dephenolized aqueous solution showed that an extraction euivalent to a distribution coefficient of 11.8 was obtained.

The phenol-enriched extractant was washed first with an equal volume of a 20% aqueous solution of sodium hydroxide and then with two equal volumes of water. One volume of the so-treated extractant was employed to remove phenol from five volumes of another portion of the said aqueous solution of phenol. The extractant and solution were mixed for a period of about two minutes at room temperature, and the mixture was then allowed to settle. The decanted extractant exhibited a distribution coefficient of 10.8.

*Example V*

Another portion of the residue from the fraction distillation of the product of the first stage of the Oxo process described in Example I was employed as a phenol extractant. Prior to use, the Oxo-bottoms product was steam-distilled until approximately 25% of the bottoms product was carried overhead as distillate. The steam distillation was performed at atmospheric pressure and the first condensate that was recovered contained 29 volume percent of oil. Distillation was continued until a negligible quantity of oil appeared in the condensate. An average of 15.2 volume percent of oil was obtained. A distillation analysis of the distillate indicated that a substantial portion of the primary carbonyl and hydroxyl products was removed from the extractant by the steam distillation.

One volume of the residue from the steam distillation was employed to extract phenol from an aqueous solution containing 1930 parts per million of phenol. Extraction was performed at atmospheric temperature and pressure. The mixture was shaken for a period of about two minutes and was thereafter allowed to settle for an extended period until the raffinate became reasonably clear. The aqueous raffinate was found to contain 580 parts per million of phenol, the extractant thus exhibiting a distribution coefficient of 11.6.

The phenol-enriched extractant was lightly steam-distilled, only 57.5 cc. of distillate being carried overhead. The steam-distilled extractant was then brought into contact with another five volumes of the said aqueous phenol solution and, based on the concentration of phenol in the aqueous raffinate, the extractant exhibited a distribution coefficient of 7.2.

The phenol-enriched extractant was again steam-distilled and 101 cc. of distillate were carried overhead. Analysis of the distillate indicated that a substantial portion of the phenol liberated by this distillation step was absorbed during the first extraction and had not been removed by the first steam distillation step. The steam-distilled extractant was again employed to dephenolize an additional five volumes of the said aqueous phenol solution and upon separation and analysis of the raffinate, the extractant was found to exhibit a distribution coefficient of 9.4.

A favorable economic aspect of the present process is the fact that the bottoms product of the Oxo process need not be extensively pretreated nor need it be fractionated into its various components to provide an efficient phenol extractant, especially for the removal of phenols from dilute solutions. Although the present improvement is especially useful in the extraction of the monohydric phenol, this improvement also comprehends the recovery of other phenols, such as the homologs of phenol, e. g., the cresols, or the polyhydric phenols.

Having described our invention, we claim:

1. In a process of dephenolizing an aqueous solution of phenols, the steps of maintaining the said aqueous solution at a pH of less than about 9 by adjusting to the said pH any solution having a greater pH, extracting phenols from the said aqueous solution with an extractant consisting essentially of at least a fraction of a distillation residue of a product of the first stage of an Oxo synthesis that comprises reacting an olefin having from 3 to about 16 carbon atoms per molecule with hydrogen and carbon monoxide in a mol ratio between about 1:4 and 4:1 and in the presence of a cobalt catalyst compound, the said extractant containing the following water-insoluble components: 10 to 50% aldehydes, 1 to 15% acid, 5 to 40% esters, 0 to 10% alcohols, and the remainder acetals and condensation products, separating phenol-enriched extractant from the treated aqueous solution and separating phenols from the said extractant to regenerate the same for treatment of further quantities of the said aqueous solution.

2. The process of claim 1 in which the phenol-enriched extractant is regenerated by distillation at elevated temperatures and less than atmospheric pressure.

3. The process of claim 1 in which one-half to twenty volumes of the said aqueous solution of phenols are treated with one volume of the said extractant, in which the extraction is performed at a temperature between 10° and 80° C., and in which the aqueous phenol solution and said extractant are mixed for a period between 10 seconds and 15 minutes before being allowed to settle and separate.

4. In a process of dephenolizing an aqueous solution of phenols, the step of extracting phenols from the said aqueous solution with an extractant consisting essentially of at least a fraction of a distillation residue of the product of the first stage of an Oxo synthesis that comprises reacting an olefin having from three to sixteen carbon atoms per molecule with hydrogen and carbon monoxide in a mol ratio between about 1:4 and 4:1 in the presence of a cobalt catalyst compound, at a temperature between 100° and 250° C., and a pressure of 100 to 300 atmospheres, said extractant containing the following water-insoluble components: 10 to 50% aldehydes, 1 to 15% organic acids, 5 to 40% esters, 0 to 10% alcohols and the remainder acetals and condensation products, separating phenol-enriched extractant from the treated aqueous solution, and steam-distilling the said phenol-enriched extractant to remove phenols therefrom and regenerate the extractant for the treatment of further quantities of aqueous phenols solution.

5. A process of extracting phenols from aqueous solutions thereof having a pH of less than about 9, the said process comprising: treating one-half to twenty volumes of the said dilute aqueous phenols solution with one volume of an extractant consisting of at least a fraction of the distillation residue of a product of the first stage of an Oxo synthesis and comprising 10 to 50% aldehydes, from about 1 to 15% organic acids, about 5 to 40% esters, 0 to 3% alcohols, and the remainder acetals and condensation products, said Oxo synthesis being effected in the presence of a cobalt catalyst compound by reacting an olefin having from 3 to about 16 carbon atoms per molecule with hydrogen and carbon monoxide in a mol ratio between about 1:4 and 4:1, thoroughly mixing the said solution and extractant for a period of between about 10 seconds and 15 minutes, thereafter separating phenol-enriched extractant from an aqueous raffinate, steam-distilling the phenol-enriched extractant to recover phenols therefrom, and treating another portion of dilute aqueous phenols solution with an extractant comprising the said steam-distilled extractant.

6. The process of claim 5 in which the extractant, which consists of at least a fraction of the distillation residue of the first stage of an Oxo synthesis is pretreated, prior to admixture with dilute phenols solution, by steam distillation by which a portion of the more volatile constituents of the said residue is removed therefrom.

References Cited in the file of this patent

UNITED STATES PATENTS

| Number | Name | Date |
|---|---|---|
| 1,986,320 | Burdick | Jan. 1, 1935 |
| 2,199,786 | Dierichs et al. | May 7, 1940 |
| 2,358,979 | Isham et al. | Sept. 26, 1944 |
| 2,368,931 | Leum et al. | Feb. 6, 1945 |
| 2,473,995 | Gresham et al. | June 21, 1949 |